Dec. 6, 1938.　　　　L. C. COLE　　　　2,139,403
MACHINE TOOL
Filed Sept. 8, 1934　　　10 Sheets-Sheet 1
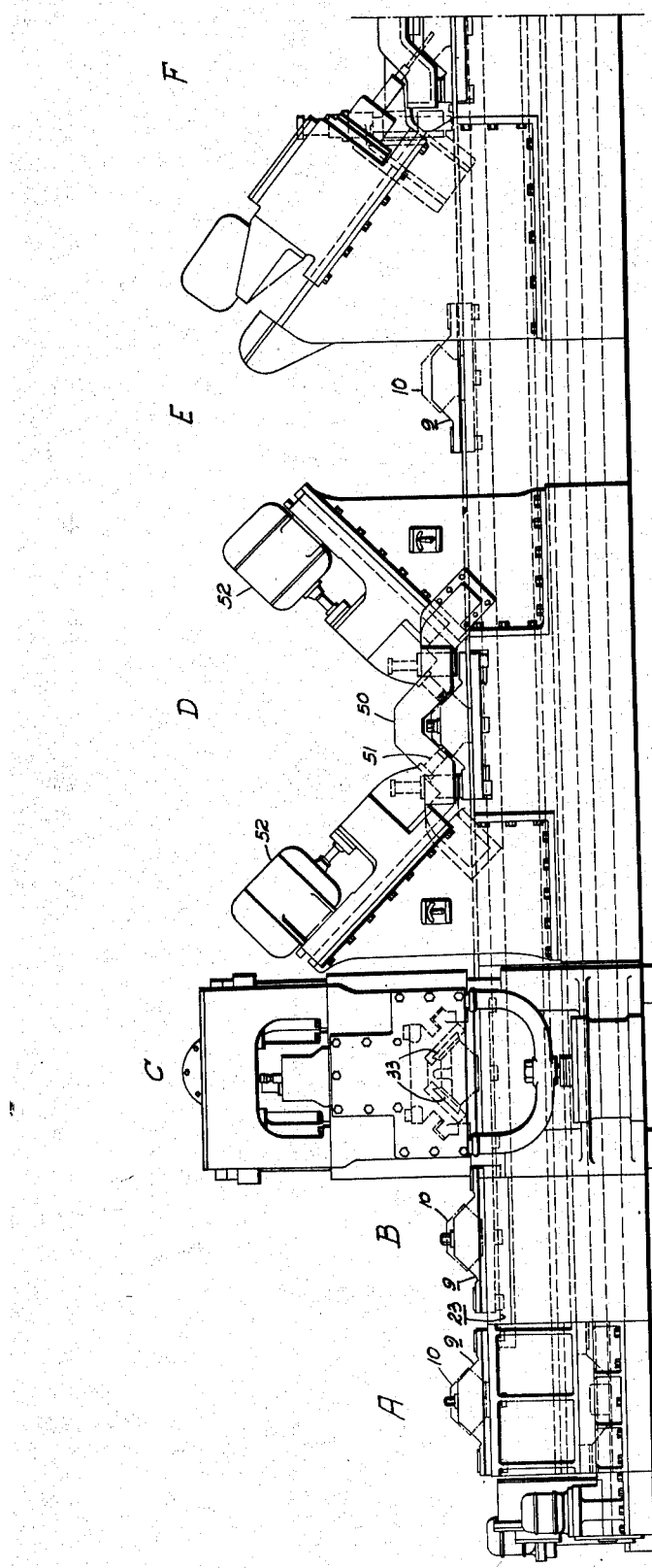
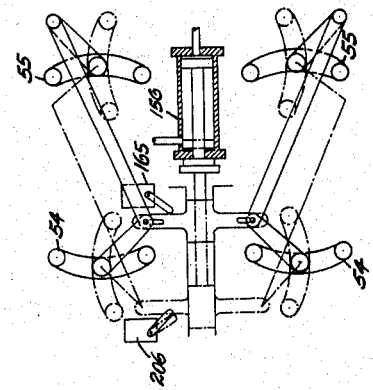
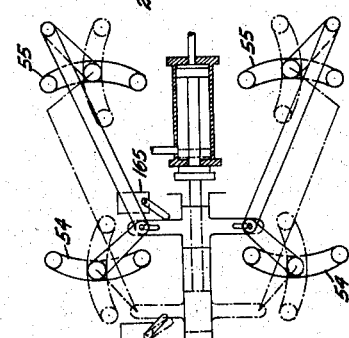
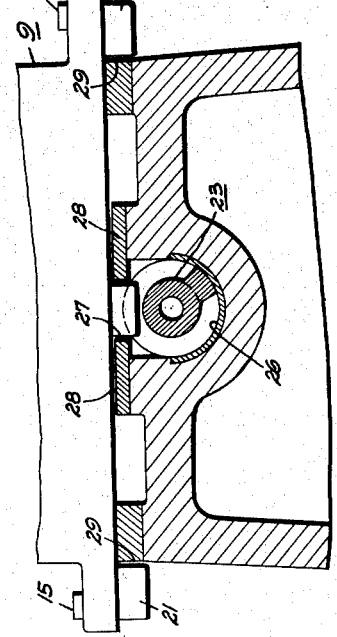
Inventor
Lyndon C Cole
Maréchal & Noé
Attorney Dec. 6, 1938.   L. C. COLE   2,139,403
MACHINE TOOL
Filed Sept. 8, 1934   10 Sheets-Sheet 2

Inventor
Lyndon C Cole
By Maréchal & Noz
Attorney

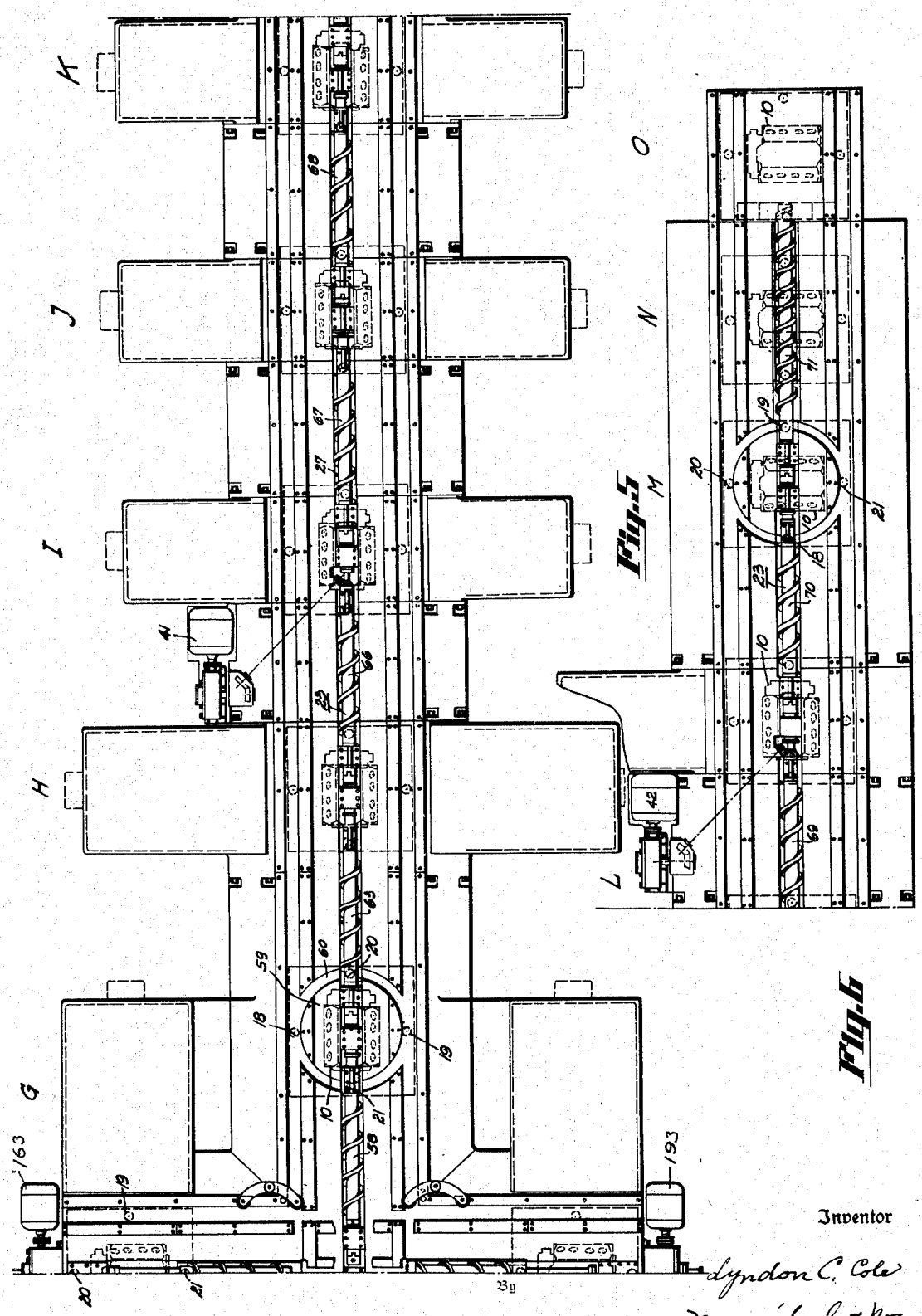

Inventor
Lyndon C Cole
By
Maréchal + Noe
Attorney

Dec. 6, 1938.　　　　　　L. C. COLE　　　　　　2,139,403
MACHINE TOOL
Filed Sept. 8, 1934　　　10 Sheets-Sheet 6

Inventor
Lyndon C. Cole
Maréchal & Noe
Attorney

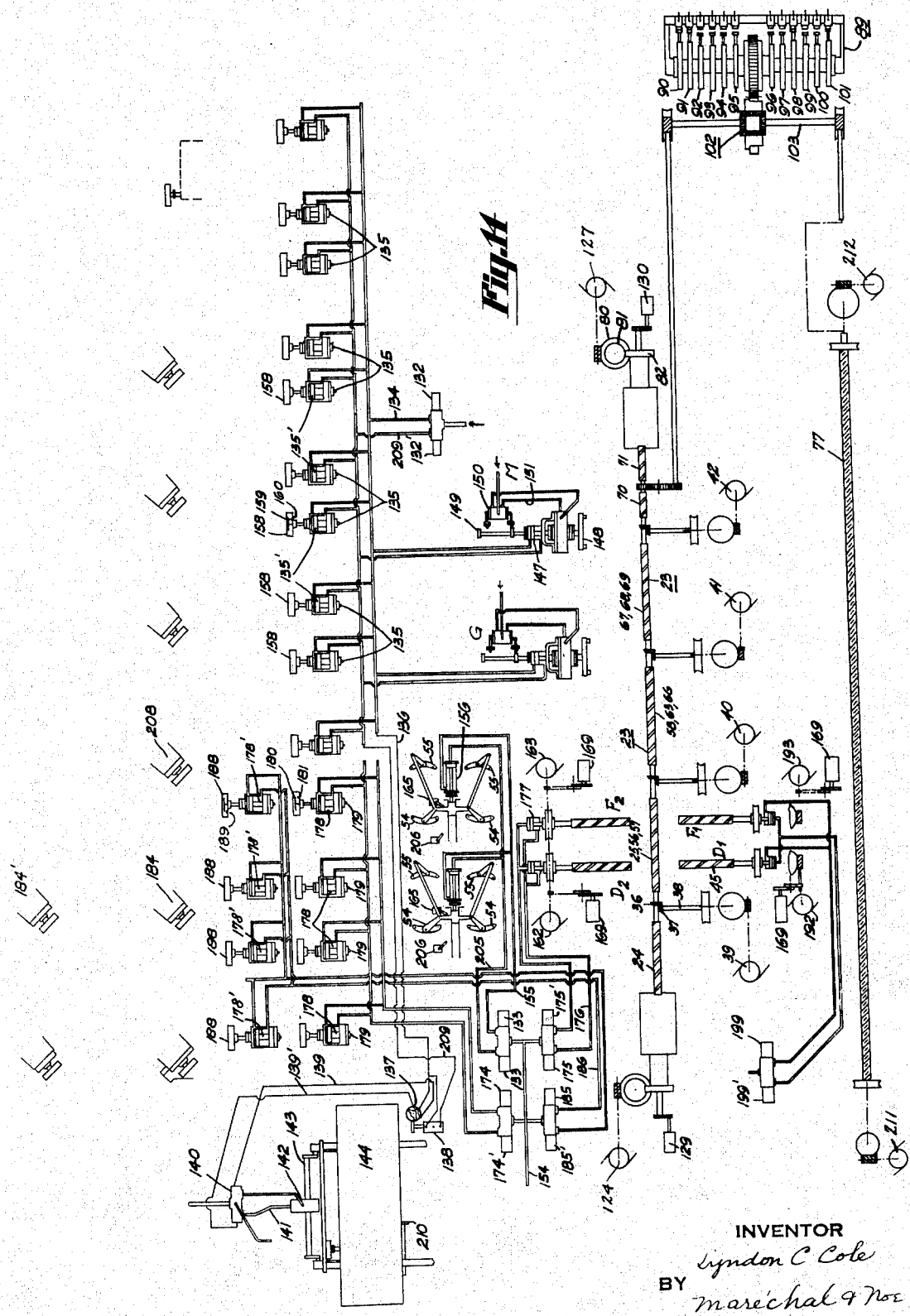

Patented Dec. 6, 1938

2,139,403

UNITED STATES PATENT OFFICE 2,139,403

MACHINE TOOL

Lyndon C. Cole, Hamilton, Ohio, assignor to General Machinery Corporation, Hamilton, Ohio, a corporation of Delaware Application September 8, 1934, Serial No. 743,231

18 Claims. (Cl. 29—33)

This invention relates to apparatus for performing a number of desired operations on work pieces in a sequential manner.

One object of the invention is the provision of a method, and apparatus for carrying out such method, for performing interrelated sequential operations in timed relationship on an advancing line of work pieces, in which the operations are carried out rapidly and in a very economical manner.

Another object is the provision of a process and apparatus in which alternate work pieces are moved in carrying fixtures out of the line of advance to opposite sides of the line into machines for performing operations requiring a longer time than those machines or mechanisms in the line.

Another object of the invention is the provision of a series of mechanisms adapted for successive operations on work pieces mounted in carrying fixtures, feeding means being provided for moving the fixtures different amounts in accordance with the distance between the successive stations, such feeding means being of simple construction and adapted to move the fixtures simultaneously the required distances.

Another object of the invention is the provision, in a series of operating mechanisms following one another and adapted for successive operations on work pieces, of a common feed screw for the fixtures which carry the work pieces, together with means cooperating with the feed screw for guiding the fixtures in their proper attitudes in the desired path of travel.

Another object of the invention is the provision of a series of mechanisms of the character referred to, having control means for starting and stopping the various operations in proper timed relationship one with another and arranged to carry out the various operations with a minimum of lost time.

Other objects and advantages will be apparent from the following description, the appended claims and the accompanying drawings in which,—

Figs. 1, 2 and 3 taken collectively show a side elevation of a series of mechanisms embodying the present invention for carrying out sequentially a number of different operations on a series of work pieces;

Fig. 4 shows a top plan view, partly in section to disclose the fixture feeding mechanism, of one end of the series of mechanisms, this view corresponding to the construction shown in Fig. 1;

Figs. 5 and 6 show top plan views of the series of operating mechanisms corresponding respectively to the constructions shown in Figs. 2 and 3;

Fig. 12 is a diagrammatic showing of the guiding control levers used at a transfer station;

Fig. 13 is a sectional view through the feeding screw and fixture guide;

Fig. 14 is a diagrammatic showing various elements of the control and operating system by which the control of the starting and stopping movements are effected;

Figure 2:
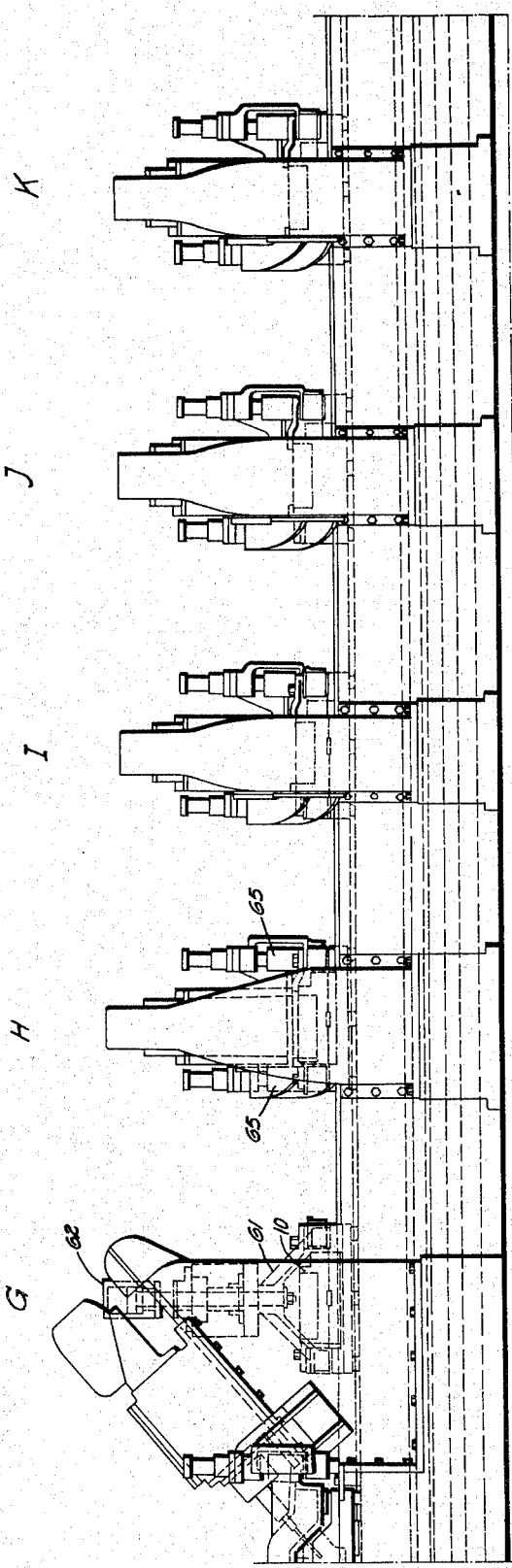
Figure 3:
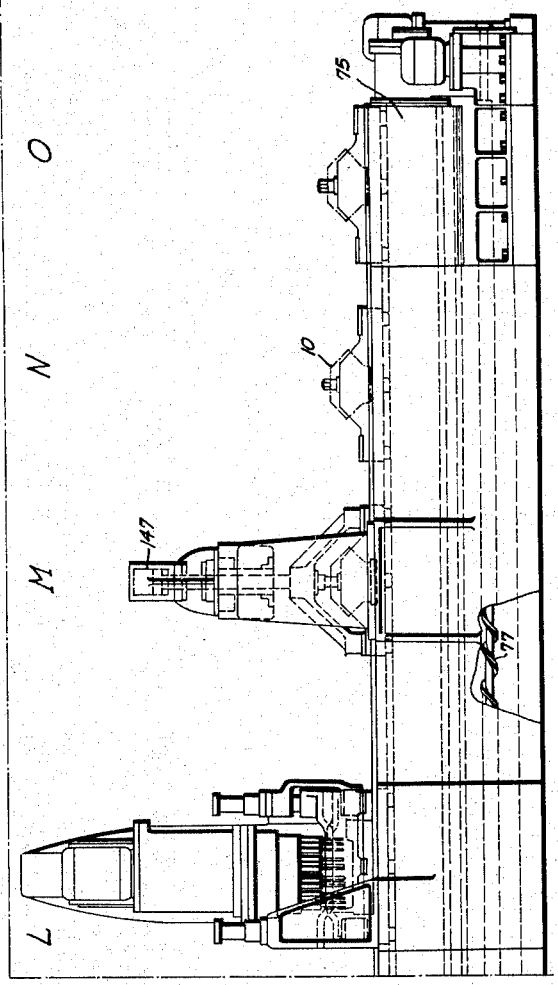
Figure 1:
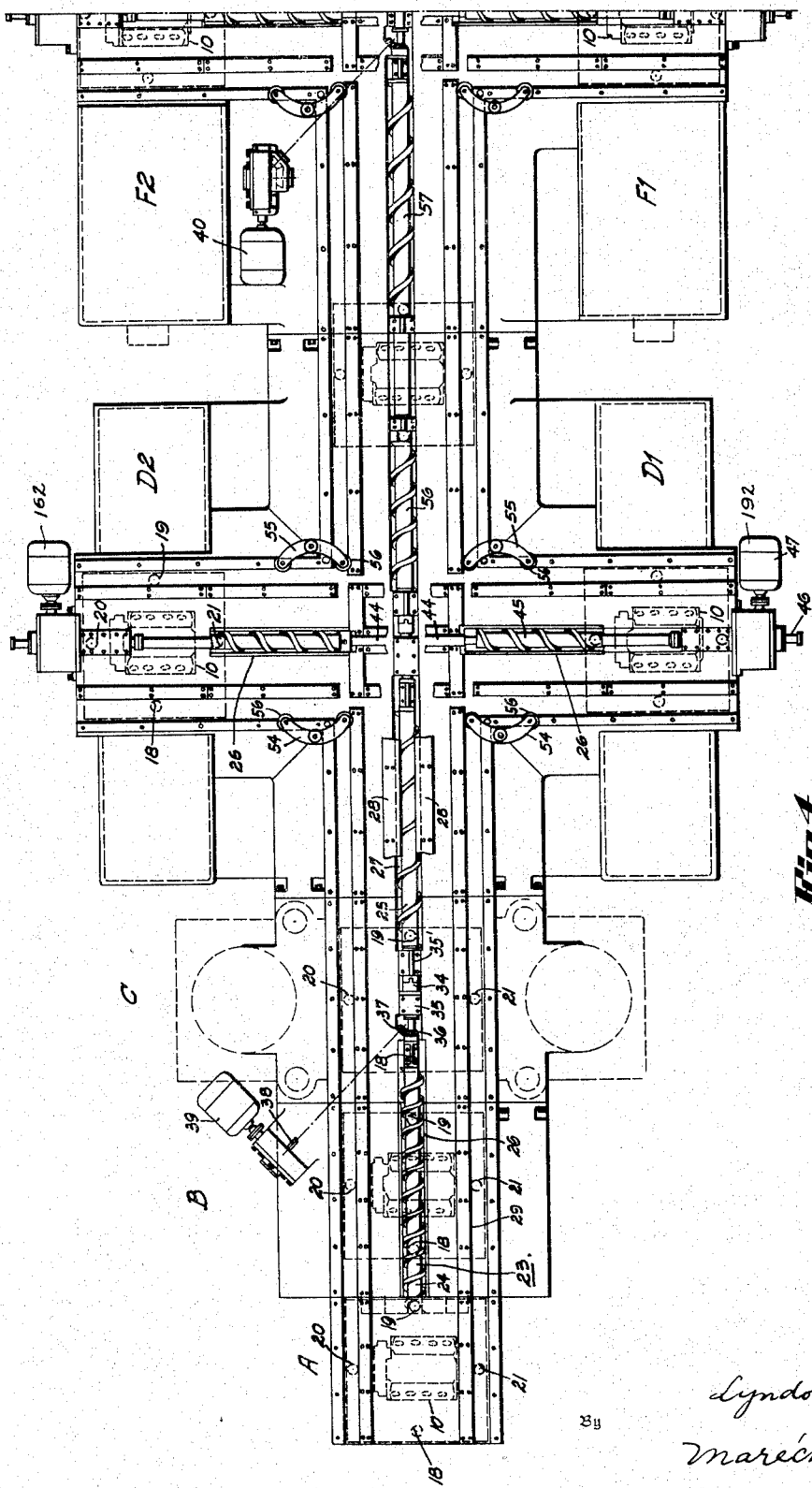

The invention as herein set forth is described, for purposes of illustration, as applied to the machining of engine cylinder blocks, but it will be apparent that other forms of work pieces requiring various machine operations may be operated upon in accordance with the process and by the apparatus herein set forth. Furthermore as herein described, the invention comprises machines for broaching and drilling the work pieces, but other types of machines adapted for cutting or otherwise operating upon the work may be employed in conjunction with or in place of the drilling or the broaching machines.

Referring more particularly to Figs. 1 to 6 inclusive, the series of machines or mechanisms starts with an indexing table station designated generally by the letter A and provided for rotating an empty work carrying fixture or holder that has been moved back from the end of the line so as to bring the fixture into alignment with the series of advancing fixtures. The fixture is then moved to the loading station B, and as the fixture remains stationary between feeding or advancing steps, the operator has sufficient time to apply the work, such as the engine cylinder block 10, to a fixture during the time following the positioning of the fixture at the top of the indexing table at station A and before the fixture is advanced from station B to the broaching machine C.

The broaching machine is a mechanism for carrying out surface broaching to machine the cylinder banks, the cutting or broaching of the work taking place in a line transverse to the line of the machine series, as more fully set forth in my prior application for Letters Patent, Serial No. 714,044 for Machine tool, filed March 5, 1934.

After the broaching of the cylinder banks has been completed at station C, the fixture, carrying the work with it, is moved a further step to station D. The operation at station D is, for example, a rough boring operation of the cylinders. This operation requires somewhat longer than the operations carried out at station C and some of the following stations, and to provide a small minimum time between feeding steps of the whole series of fixtures, successive fixtures advanced to station D are moved laterally to opposite sides of the line of advance into two separate boring machines $D^1$ and $D^2$, one fixture for example moving out to machine $D^1$, the next fixture moving out to machine $D^2$, and a following fixture moving out to machine $D^1$, the fixture previously supplied to machine $D^1$ having just previously moved back into the line of advancing fixtures and again resuming its forward movement along the line.

After leaving the station D a fixture travels on to an idle station E which may be provided between station D and the next machining station F. At station F, as at station D, the time for carrying out the desired machining operation may be comparatively long, and as herein shown, two similar operating mechanisms $F^1$ and $F^2$ are provided at opposite sides of the line and adapted to receive alternate fixtures from the advancing line. The machines $F^1$ and $F^2$ may drill the valve guides and the push rod holes of the engine cylinder block.

After leaving the station F, the fixture is moved ahead to a turn table station G, where it is rotated about a vertical axis through 90 degrees so that the cylinder rows which previously extended transversely of the line of advance will be so moved as to extend parallel to the line of advance. In this latter position, the work, carried by the fixture, is moved another feeding step to station H, and it is there operated on by drill mechanism which can, for example, drill the valve throats. The opposing drill banks at station H incline downwardly and inwardly towards the line of advance instead of inclining in planes parallel to the line of advance as at stations D and F.

The next feeding step takes the fixture and the work to station I, which as herein shown is another drill mechanism adapted to drill holes in the cylinder banks. The next feeding step carries the work to station J, another drilling mechanism, for chamfering the holes in the cylinder banks. A further step carries the work to station K for chamfering the ends of the cylinder bores. The next station is station L, where holes are drilled in the top of the cylinder block. This is followed by station M, another turn table station, where the fixture is rotated again through 90 degrees to bring it back to its original attitude with the cylinder rows extending transversely to the line of advance. The next station is an idle or unloading station N, and the last advancing step takes the fixture to station O where it is indexed by moving it about a line parallel to the line of advance, thus inverting the fixture and moving it into the line of return which, as herein shown, is below the line of advance. The work is removed from the fixture at stations N or O before the indexing or rotating movement of the fixture takes place.

After the fixture is inverted, at the end of the line, it is then moved back rapidly to the head of the line and then moved up into the line of advance. Another work piece is then secured to it and moved up into the line of advance.

It will be understood that in carrying out the various machining or cutting operations on the work as the work passes through the line of mechanisms, the work is fed forwardly predetermined distances step by step, the work remaining fixed while being operated upon by the mechanisms and travelling from one mechanism to a succeeding mechanism so that when the work reaches the end of the line a large number of operations have been completed, and the work can then be removed and other operations carried out, if desired, in another line of mechanism adapted for the particular operations to be subsequently performed.

One of the operating mechanisms of the series carries out its intended function on one work piece at that location at the same time the other mechanisms are also carrying out their intended functions on other work pieces. Thus there is a fixture at each station. As herein shown, the distances from one station to the next vary at different positions along the line of advance, so that the feeding steps of the fixtures are of different lengths at different points. The feeding movements of the fixtures in their advancing travel, however, take place at the same time, means being provided, as will be more fully described, for giving the desired feeding movement to a fixture in accordance with the distance between successive operating mechanisms or stations.

Figure 10:
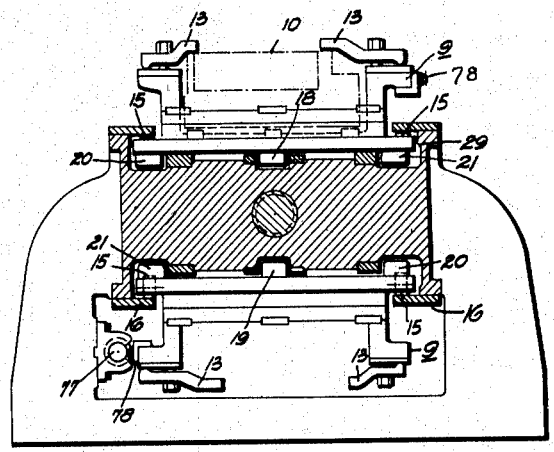
Fig. 10 is a transverse section through the fixture and track at the index table.
Figure 9:
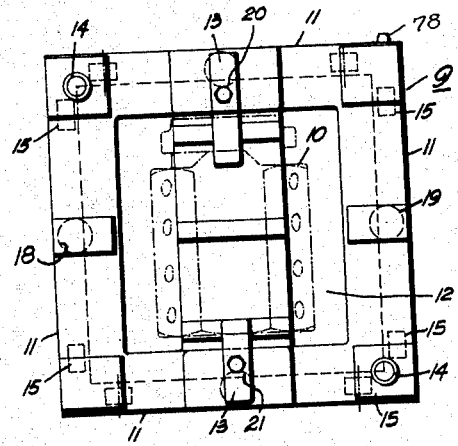
Fig. 9 is a top plan view of one of the fixtures, showing the work which it supports in dotted lines.

The work carrying fixtures, one of which has been illustrated in Figs. 9 and 10, as indicated generally by reference numeral 9, are preferably square as viewed from above. Each comprises a vertical wall portion 11 and a bottom portion 12 on which the cylinder block or other work is clamped in a predetermined position, as by means of the holding clamps or arms 13.

At a plurality of spaced points, preferably at diagonally opposite corners of the fixture, the vertical walls 11 are socketed or recessed as indicated at 14, the sockets serving as locating points by means of which the fixtures are exactly and accurately located in a machine after being moved into approximate position in the machine by the feeding means. Each machine has a pair of studs on a pressure block which is moved down after the fixture is approximately located so that the studs enter the sockets 14 of the fixture and cooperate therewith to accurately position the fixture with respect to the cutting tools of the machine.

Adjacent each corner and near the lower portion of the fixture are rollers 15 adapted to operate along carrying tracks 16, see Fig. 10 during the returning movement of the fixtures when they are inverted. Each fixture is also provided with four downward projections that extend down from the fixture base, in the form of cylindrical pins or rings 18, 19, 20 and 21. These rings are rotatably mounted in the bottom wall of the fixture and serve to guide the fixture in a straight path during its advancing movement and to cooperate with a feeding screw which produces the desired feeding movements.

The feeding screw, which is generally designated by the numeral 23, comprises a number of sections. The first section 24 is adapted to move the fixture from the indexing table at the head of the line to the idle station B as the feed screw is rotated a predetermined number of revolutions, the machine as illustrated being adapted for nine revolutions of the feeding screw to advance a fixture from one stopping point to the next. The left-hand end of the screw section 24 as viewed in Fig. 4, projects far enough so that the upper portion of the thread on the screw after rotating a part of a revolution will engage the forward pin or projection 19 of a fixture moved up into position by the indexing table at station A. Nine revolutions of the screw section 24 will then carry the fixture ahead to the position shown in dotted lines in Fig. 4 at station B. After a predetermined time interval, the screw shaft will again rotate nine more revolutions thus moving the fixture from station B to the center of station C. The thread spacing of screw section 24, as shown in Fig. 4, is such that the two pins 19 and 18 are simultaneously engaged with the threads. The distance between the pins 18 and 19 may for example be 36″, and the threads on the screw section 24 may have a pitch of 6″ so that the pin 19 is first engaged alone and after the fixture is advanced from the indexing table the pin 18 is also picked up by the thread of the screw.

The threads on the screw section 24 terminate at such a point as to leave the fixture centered at station C after the rear pin 18 passes beyond effective propelling engagement with the thread. This brings the forward pin 19 of the fixture into such position that after a predetermined angular travel of the screw of about 90 degrees, the thread on the next section 25 of the screw will be brought into propelling engagement with pin 19 and move the fixture through another advancing step.

The screw sections, which are connected together for simultaneous rotation, are rotatably carried in a series of bearings at the ends of the sections. The forward end of the first screw section and the rear end of the last section, and likewise the outer ends of the auxiliary transverse screw sections, are also carried in a semi-cylindrical bearing shell 26 which engages the outer portions of the threads on the screw as shown in Fig. 13, leaving the upper portion of the screw exposed through a central slot 27 in the bed of the fixture support. This slot 27 which extends the length of the various machines and which is formed by the two spaced guide plate portions 28 forms a guide for the rotatable pins 18 and 19 of the fixture. In Figs. 4, 5, and 6 the machines are illustrated with the plate portions removed except at one point at station D, for purposes of better illustration. The side pins 20 and 21 operate freely between the surfaces 29, which extend lengthwise of the series and at opposite sides of the fixture bed on which the bottom of the fixture is slidable. The fixture is therefore maintained in its desired attitude as it is moved forwardly by the feed screw.

Before the fixture is moved from station C, and while the screw is stationary, the desired machining operation is carried out at station C. The mechanism at this station is a broaching machine, as previously mentioned, having broaching tools 33 carried by a suitable ram which operates transversely of the line of advance and cuts the cylinder bank surfaces simultaneously, this operation being carried out comparatively rapidly and requiring only a fractional part of a minute even for a large surface such as a cylinder block. It will be understood that when the fixture is first moved to the position C by the screw section 24, and at the end of the feeding movement, the vertically movable pressure block 32 of the broaching mechanism C will descend and bring the locating pins provided thereon into the locating sockets 14 of the fixture, which are suitably tapered to facilitate the engagement of the locating pins, so as to exactly position the fixture at this station. The broach then moves across the work, performing its intended operation, and returns, and during or after its returning movement the pressure block 32 rises so as to free the fixture for further forward movement.

The feeding screw section 25 which follows the section 24 is connected in a removable manner to the end of section 24 by an interlocking tongue and groove device 34 forming a joint which insures simultaneous rotation at both sections. The rear or run off end of the section 24 is journalled in a suitable bearing 35 which is provided below the path of the pins 18 and 19 of the fixtures and which definitely holds the section against longitudinal movement. On the opposite side of coupling 34 is a second bearing 35′ which rotatably supports the forward end of section 25 without, however, holding this end against longitudinal movement, as it is only the run off or rear end of each screw section that is so held in order to provide for expansion effects. Adjacent the bearing 35 is a bevel gear 36 of such size as not to project into the path of travel of the fixture pins, this bevel gear meshing with a driving pinion 37 carried on a shaft 38 which extends out angularly as shown in Fig. 4 for driving connection with an electric motor 39. Similar motors 40, 41 and 42, and similar driving connections of the screw or feeding shaft are provided at spaced points along the screw so that the entire screw will be driven at a number of spaced points and the driving force and torque tendencies thus distributed.

The feeding screw 25 moves the fixture a much greater distance than the first and second feeding steps, the distance from the center of station C to the center of station D being comparatively long. The pitch of the threads on the screw section 25 is much greater than the pitch of the threads on section 24, so that nine turns of the shaft will advance the fixture the comparatively long distance from station C to station D, the pitch being properly coordinated with the distance through which the fixture is to travel from one station to the next. The pitch of the threads in the section 25 may for example be 12″ so that the spacing between the pins 18 and 19 on the fixture is a multiple of the thread pitch in order that the threads of the screw section simultaneously operate in propelling the two pins 18 and 19 of the fixture during its advancing movement up to the station D. The distance between threads of section 25, and also between the threads of all the other sections of the feeding screw is considerably greater than the diameter of the pins 18 and 19 on the fixtures.

When a fixture reaches station D, the main feed screw stops, leaving the fixture in the center of the station, but free of lateral restraint, as the side pins 20 and 21 are now positioned opposite the slots 44 which extend transversely of the line of advance, and as the guide plates 28 are interrupted directly opposite the pins 18 and 19 at the stopping position of the fixture. The fixture is thus free to be moved laterally to either side of the line. The fixture is moved out of the line of advance to the machine or mechanism D¹ by means of an auxiliary feed screw 45, similar in construction to the screw section 25. The threads on this section 45, however, with the screw section in its normal position, terminate outwardly beyond the path of the side pin 21, and in order for the pin 21 to be picked up by the threads on this section 45, the latter is moved endwise toward the fixture the proper amount under the control of a fluid pressure operated plunger 46, the screw section 45 then being rotated by an electric motor 47 to move the fixture laterally into the machine D¹. When the pin 20 of the fixture has been moved beyond the end of the threads on the auxiliary screw section 45 the fixture is approximately positioned in the desired relationship with respect to mechanism D¹. However, to accurately and exactly position the fixture before the cutting operation on the work starts, the boring machine D¹ is provided with a locating head 50 carrying locating pins engageable with the locating holes 14 of the fixture. This head first descends and first positions and then securely holds the fixture with respect to the fixture supporting bed. After this has been accomplished the boring tools 51 are brought into effective engagement with the work. Suitable electric motors 52 are provided for operating the boring tools.

After the boring operation at machine D¹ has been completed the positioning head 50 rises, freeing the fixture so that the fixture can be moved back to the line of advance, the movement back to the line of advance being effected by the auxiliary screw 45 which is first moved endwise toward the fixture so as to bring the end of the screw threads below the fixture pin 20, this movement being effected by the fluid pressure cylinder 46. The screw is then rotated in a reverse direction by the motor 47 so as to move the fixture back to the line of advance. It will reach that position when the pin 21 has been moved to the end of the screw thread on the auxiliary section 45 while the latter is still in its outermost position.

A similar machine D² is provided at the opposite side of the line, and fixtures can be moved to and from the machine D² in the same manner as they are moved to and from the machine D¹. One fixture is moved to machine D¹, the next to machine D², etc., successive fixtures being moved to opposite sides of the line. If there is a time interval of 36 seconds between successive feeding movements of the fixtures along their line of advance, a fixture may remain in the machine D¹, for example, twice as long for the longer operation taking place in that machine, before being returned again to the line of advance. The operation of the other faster machines in the line is therefore not slowed up and a very high output can therefore be obtained.

For guiding the fixtures as they move into the station D at a time when they are not continuously guided in their advancing movements by the slots or guide surfaces along which the fixtures operate, a pair of pivoted arms 54 and 55 are provided at each side of the line of advance, see Figs. 4 and 12. These arms are rotatable through 90 degrees into the dotted line position shown in Fig. 12 so that the rotatable rollers 56 carried by the arms, after serving to guide the sides of the fixtures into the station D (or from the station D to the next succeeding station) will be effective in guiding the fixtures laterally to machines D¹ and D². The arms are automatically operated at the proper time in the sequence of operations by fluid pressure means, or the like, as will be more fully described.

After the boring operation has been completed on the work in either machine D¹ or D², the work is moved back to the line of advance and the next feeding movement of the main feeding screw propels the fixture under the action of the screw section 56 to the idle station E, another feeding operation advancing the fixture under the control of screw section 57 to station F. At station F and at opposite sides of the line of travel, as previously mentioned, are the mechanisms F¹ and F² to which alternate fixtures are supplied in the same manner as they are supplied to the machines D¹ and D². The fixtures are alternately supplied from the machines F¹ and F² back to the line of advance and then moved forwardly by the screw section 58 to a turn table station G. Here the fixture rests on a table 59 which is slotted annularly as indicated at 60 for the reception of the pins 18, 19, 20 and 21 as the fixture is rotated. The fixture is engaged by a turning head 61 which first descends under the action of a fluid pressure cylinder 62 so as to bring its locating pins into engagement with the locating holes 14 of the fixture. The head 61 is then rotated 90 degrees about a vertical axis so that the fixtures are then arranged as shown in dotted lines in Fig. 5. The head 61 then rises, freeing the fixture for further forward movement under the control of the feed screw. The screw section 63 then moves the fixture forward to station H. The drill axis at this station inclines upwardly and outwardly away from the line of advance, the mechanism H being comparatively long in a direction transverse to the line of fixture movement. By turning the work before it is moved to station H, the mechanism H may be arranged in the position as shown so as to reduce the length of the line of machines.

The work is held in the exact position desired in the machine H, by a vertically movable pressure or locating head 65 which descends before the drilling operation is started, the head 65 having locating pins engageable with the locating sockets 14 of the fixture. The head is of course released by upward movement thereof at the proper time after the drilling operation has been completed to free the fixture for further advancing movement.

After leaving the machine H, the feed screw section 66 moves the fixture to station I, and in a similar manner the screw sections 67, 68 and 69 move the fixtures to successive drilling machines J, K and L. Section 70 of the screw takes the work from station L to another turn table station which is similar to the turn table station G, but which rotates the fixture back to its original position so that the screw section 71 moves the fixtures with the work positioned in such a way that the rows of cylinders extend transversely of the line of advance. The section 71 of the screw moves the work to the unloading station where the clamping or holding arms retaining the work in the fixture are loosened and the work removed. The fixture is then automatically moved on to the rotatable indexing table 75 at station O, being moved beyond the end of the threads on the feeding screw. The indexing table is then rotated so as to invert the fixture and dump the chips from the fixture, bringing the fixture into the line of return as shown in the lower portion of Fig. 10.

Figure 7:
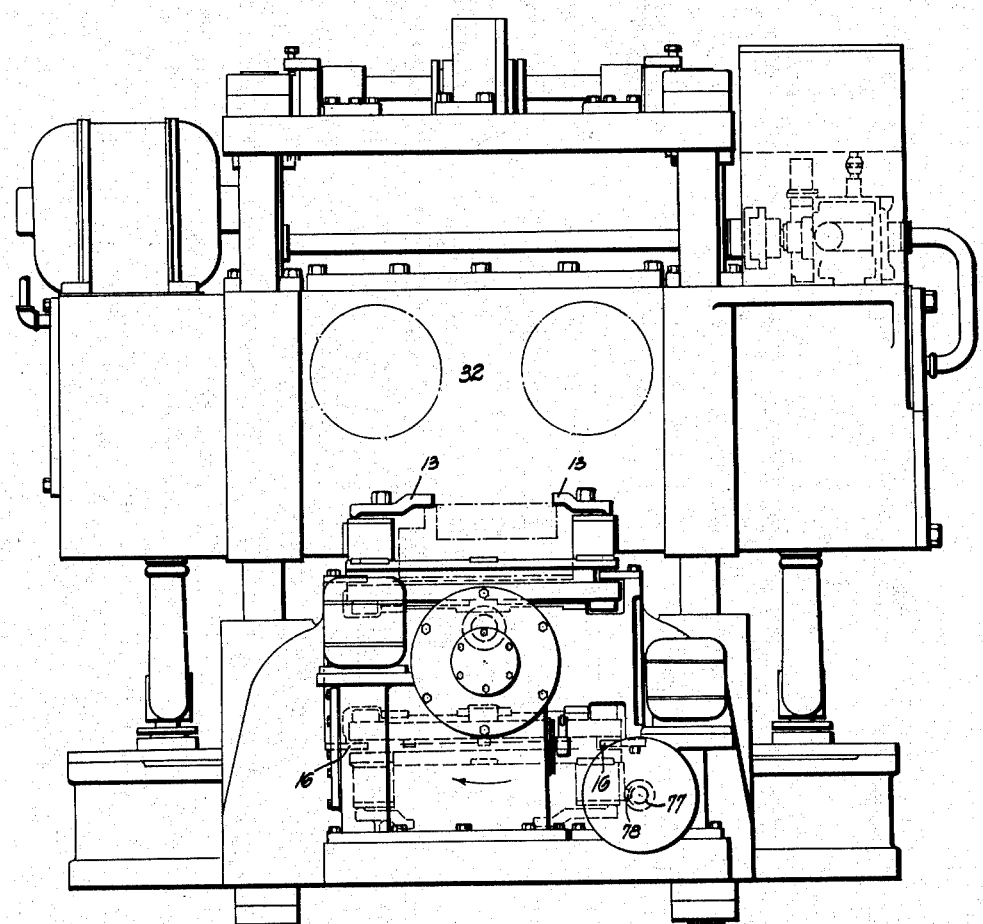
Fig. 7 is an end elevation of the machine series as viewed from the left of Fig. 1, showing the end turntable and the broaching machine.
Figure 8:
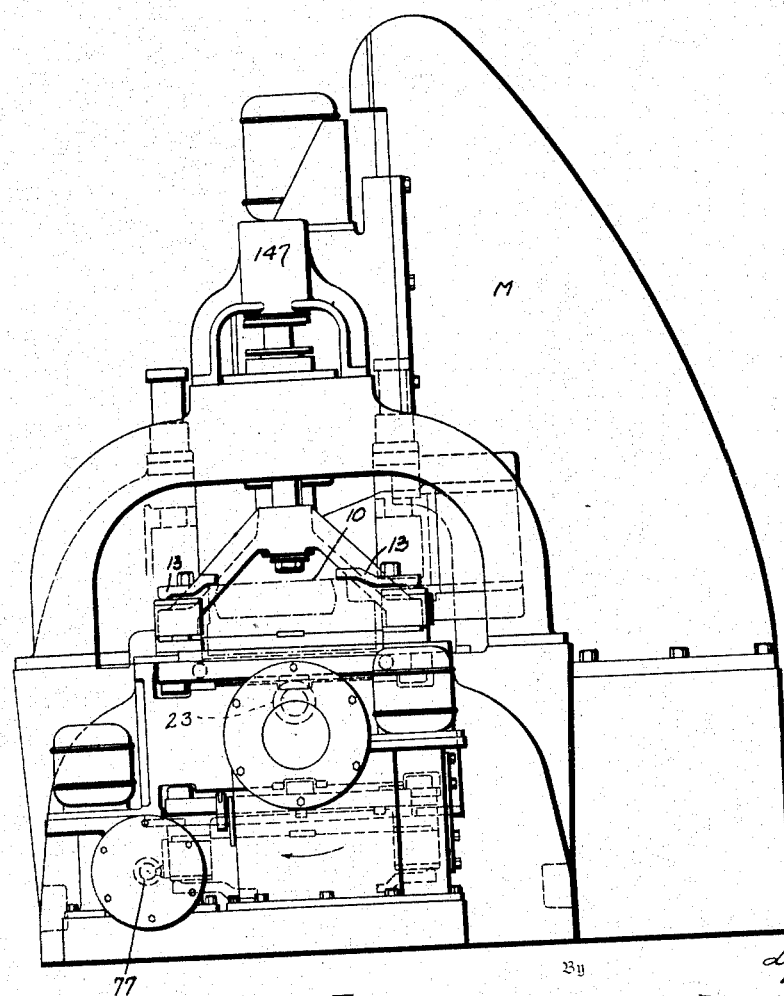
Fig. 8 is an end view of the machine series as viewed from the right hand end of Fig. 3.

The fixture is then returned to the head of the line through a passage provided in the various connected machine frames and fixture supporting bed sections provided between adjacent frames. This return movement is by means of a return screw 77 which is preferably operated at a high enough speed to return a fixture from one end of the line to the other during the time interval required for only one or for a few feeding steps of the advancing line. The screw 77 is engaged by a thread fragment 78 which projects from one side of the fixture as shown in Figs. 7, 9 and 10. The indexing movement of a fixture as it is moved at station O is always clockwise as viewed in Fig. 8, bringing the fixture to its inverted position and bringing the thread fragment of the fixture into engagement with the return screw 77. At the head end of the line the fixture is indexed in the opposite direction, that is clockwise as viewed in Fig. 7. The threads on the return screw 77 preferably terminate at such a point adjacent the head end of the line as to position the fixture on the indexing table at station A when the thread fragment on the fixture moves off of the return screw. When the fixture is moved up by the indexing table at station A it is brought into such a position, as shown in Fig. 4, that the pin 19 is somewhat to the right of the end of the thread on the screw section 24, which, however, is stopped at that time in such position as to permit pin 19 to move to a position directly above the screw axis. The comparatively long distance between successive screw threads of the screw with respect to the diameter of the fixture pin 18 readily permits this. The feeding screw is stopped automatically as will be further described so as to require about 90 degrees movement to pick up the fixture, and the relationship between the threads of adjacent sections of the advancing screw is also such that about 90 degrees movement of the screw is required before the forward pin 19 of any fixture is picked up at the start of a feeding operation.

As will be apparent from Figs. 1 to 6, the fixture carrying supports or bed sections are detachably bolted to the machine tools or operating mechanisms with which they are associated so that any mechanism can be removed from the line or series for repair purposes or the like, the sectional character of the feed screw permitting the removal of any machine tool without disturbing the positions of the other machine tools or the other parts of the feed screw.

Figure 11:
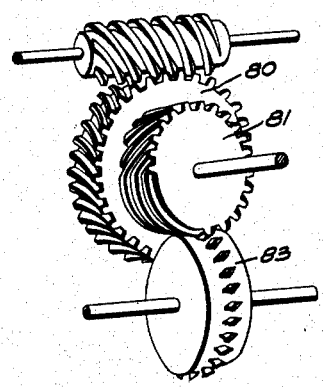
Fig. 11 shows the gearing arrangement for rotating the fixture exactly 180° at the index table.

The fixtures are moved exactly 180 degrees in their indexing or turning movements at an end of the line. This movement is accomplished by an electric motor which drives a worm operating worm gear 80, see Figs. 11 and 14. The worm 80 is fixed to a gear 81 which makes one complete rotation before the motor is automatically stopped. The grooves in the gear 81 are engaged by teeth in a gear 82 which meshes with a gear 83 fixed to the index table. 270 degrees rotation of gear 81 moves the gear 83, and consequently the index table exactly 180 degrees. The remaining 90 degrees movement of gear 81 merely holds the gear 83 exactly positioned as the grooves extend annularly in the gear 81 for one quarter of its circumference, as shown in Fig. 11.

At the beginning of each cycle of operations, the fixtures are stationary one on each longitudinal station except on the unloading index table. A fixture is on each of the two cross index sections $D^1$ and $F^1$. One fixture is on the bottom of the loading index table. All the tool heads are up, their locating pins having been withdrawn and having, at the limit of their upward movements, closed electrical contacts or switches which automatically initiate a new cycle of operations. The operator has just finished loading a block at the head of the line.

Figure 15:
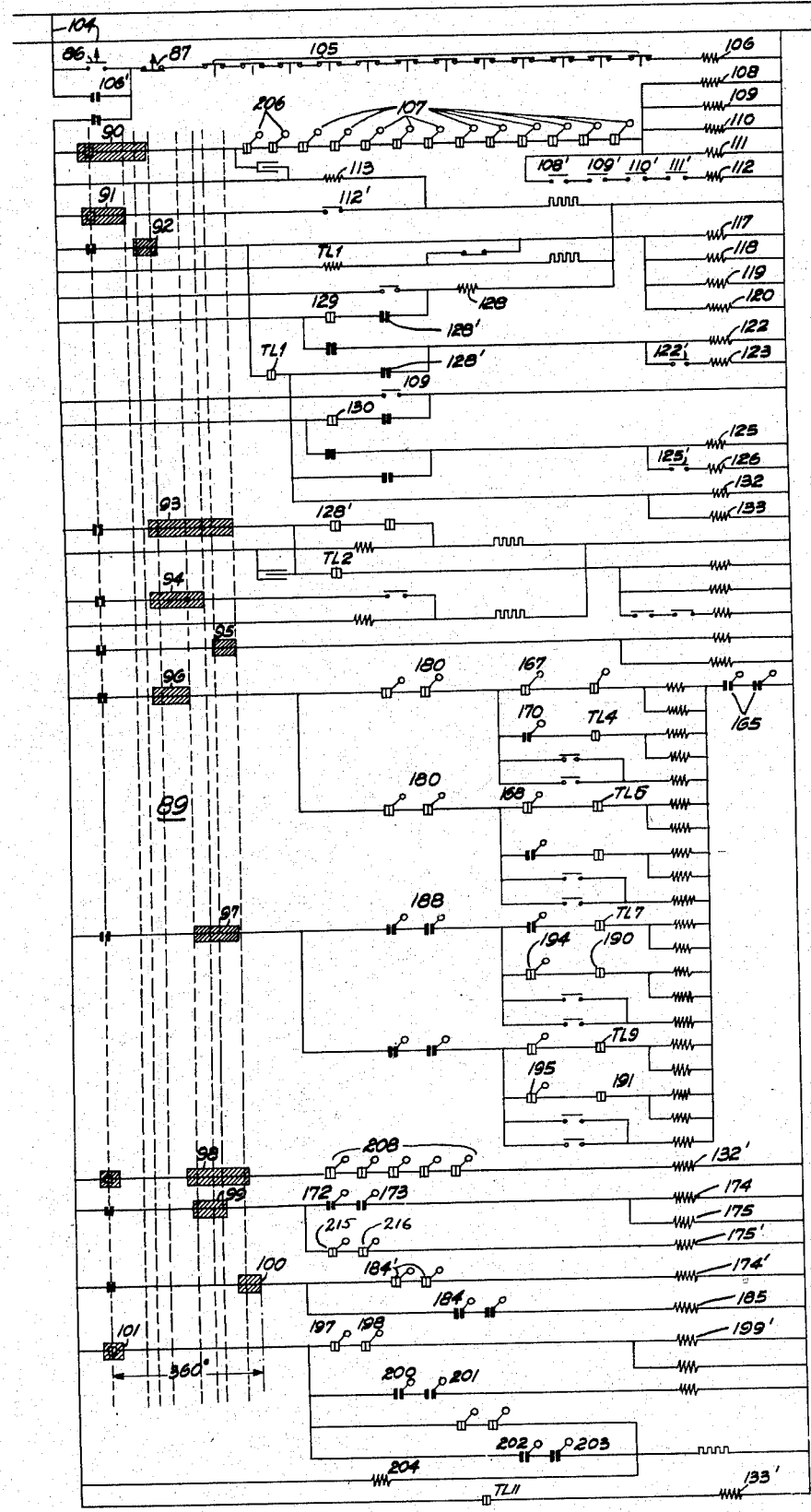
Fig. 15 is a diagrammatic showing of the electrical circuits controlled by the master drum.

Initially the whole line is started by pressing a master starting switch 86 shown in Fig. 15. From then on each cycle is initiated automatically unless the operation is stopped by the emergency switch 87 or by the tripping of overload relays. The emergency switch 87 is operated by a cable which is operated within easy reach of the controlling operator at any point along the length of the line.

Figure 16:
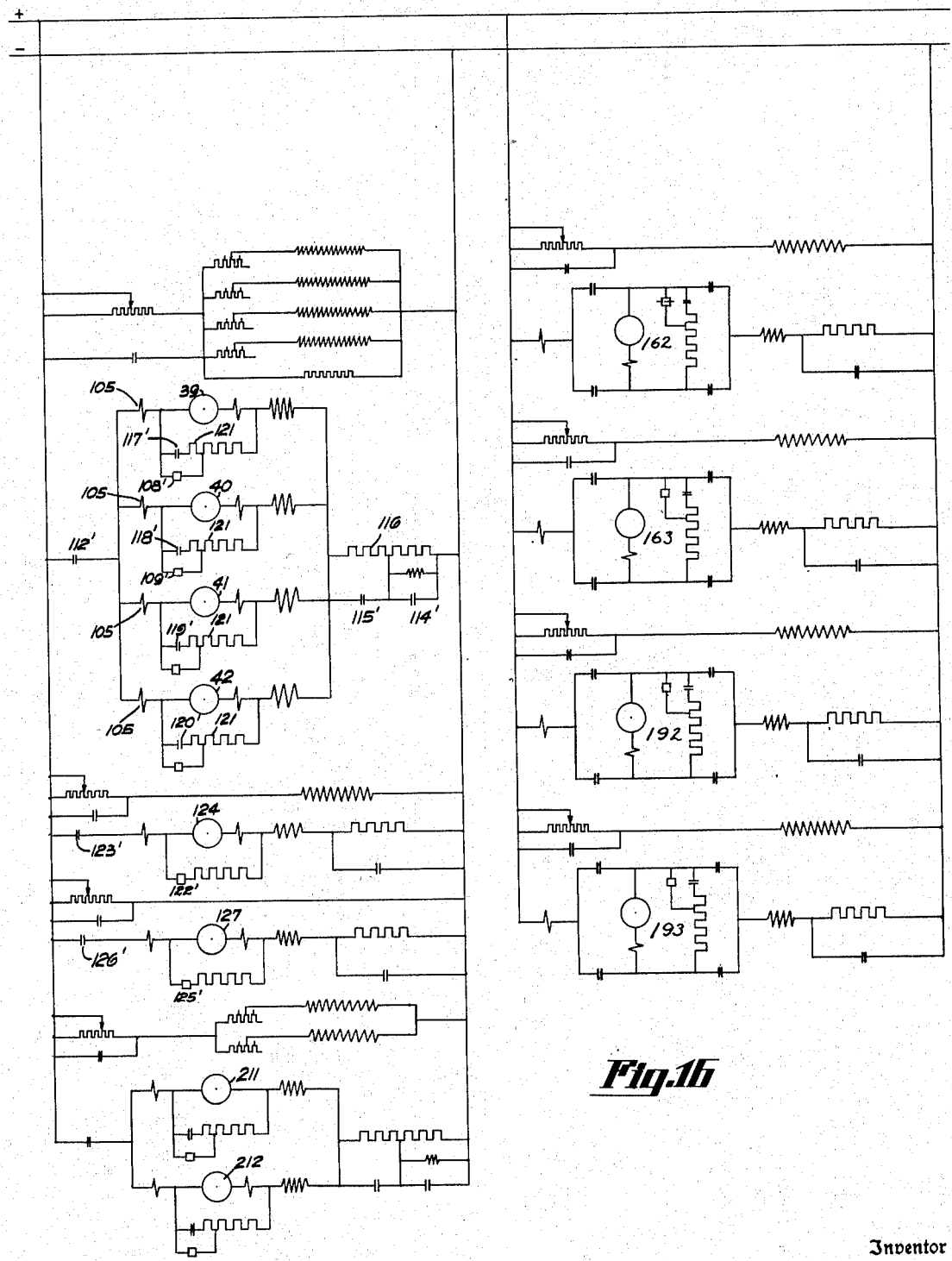
Fig. 16 is a diagrammatic showing of the motor control connections.
Figure 17:
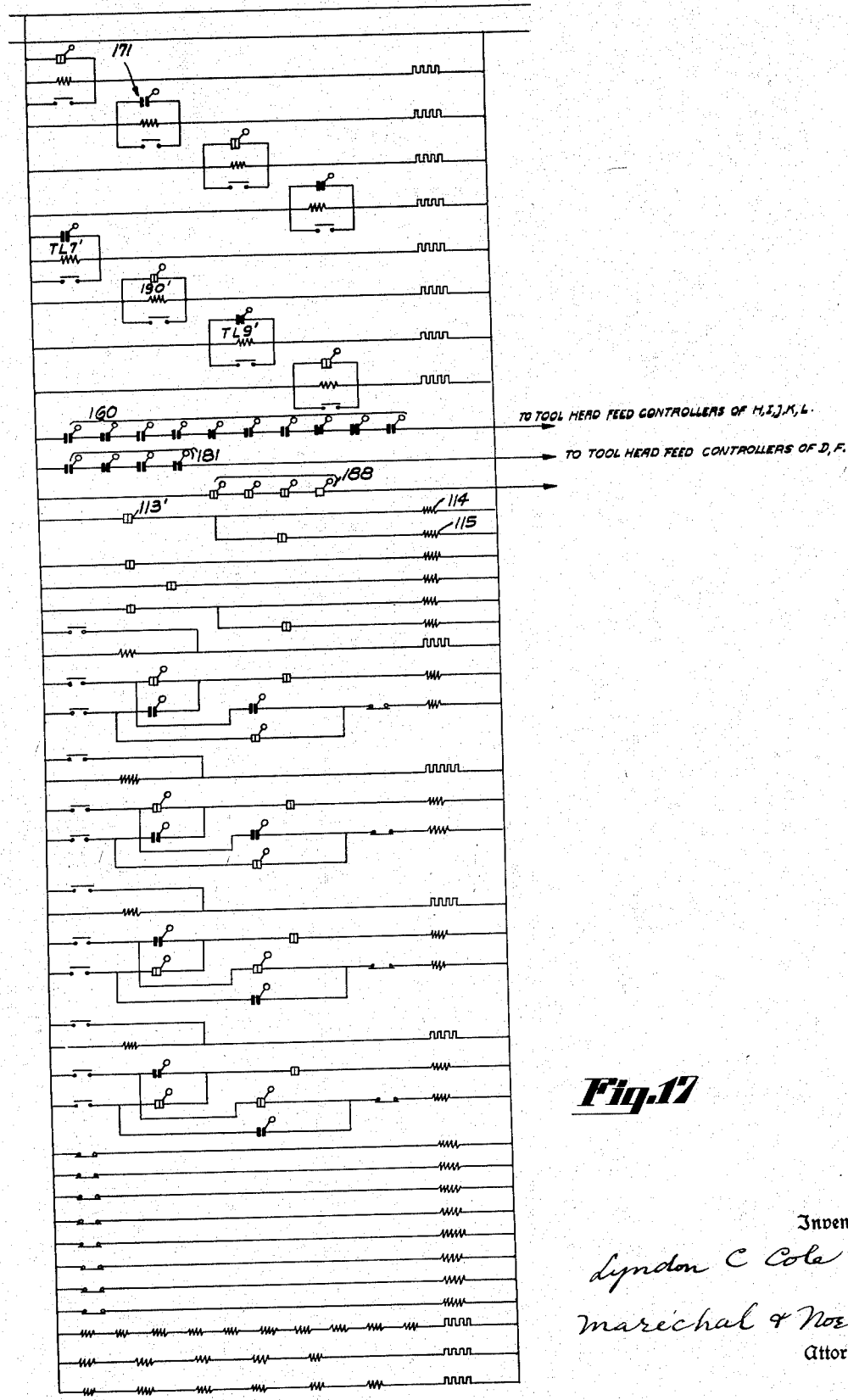
Fig. 17 is a diagrammatic view of auxiliary controlling circuits.

The apparatus illustrated in Figs. 15, 16 and 17 may be used for the automatic control of the various sequential operations. This apparatus includes a master controlling drum 89 which carries cams 90, 91, 92, 93, 94, 95, 96, 97, 98, 99, 100 and 101. Fig. 15 shows the various cams developed in a single plane throughout the 360 degrees extent of the drum. The length of each cam represents the length of angular movement in which a contact is held closed for performing its desired function. The drum 89 is driven as shown in Fig. 14 through a differential gear drive 102 from the screw 23 and also through a differential gear drive connection 103 to the return screw 77, the drum making one complete revolution for each cycle.

The stopping of the longitudinal index screw 23 at the end of nine revolutions is controlled by cam 90 opening its contact. The drum is being turned up to this point because the master switch 86 is closed and a circuit is completed across the line terminals 104 through the closed overload relays 105 and through the energizing coil 106 which energizes low voltage relay 106' which functions to short-circuit the starting switch 86 after the latter has been closed. This energizes one side of the various contacts operated by the various cams. The contact operated by cam 90 is therefore closed, completing the circuit through the various switches 107, which are automatically closed by the machine heads of the various machines when in their raised positions, energizing the coils 108, 109, 110, and 111, thus closing the switches 108' to 111' inclusive to energize coil 112. Coil 112 being energized closes switch 112', thus completing a circuit through the contact of cam 91. The switch 112' energizes the four screw driving motors 39 to 42 simultaneously (see Fig. 16) thus causing the drum to rotate, as it is connected to the screw.

After the screw has made about eight revolutions, and before the cam 90 opens its contact to stop the motors, the cam 91 opens its contact, energizing coil 113 which had been short circuited by closed switch 112'. Energizing coil 113 closes the switch 113' shown in Fig. 17 in an auxiliary circuit which energizes coils 114 and 115. The energization of these coils opens switches 114' and 115' thus cutting in a resistance 116, causing motors 39 to 42 to rotate comparatively slowly for the last revolution of the screw.

Shortly after the cam 91 opens its contact as above mentioned, cam 92 closes its contact energizing coils 117, 118, 119 and 120 thus closing contacts 117', 118', 119' and 120', cutting in a shunt resistance 121 across each motor armature which causes the motors to run more slowly until such time as the switch 112' is opened by opening the contact of cam 90 at the end of nine revolutions of the index screw, dynamic braking being applied to the motors which stop within the allowable overtravel of about sixty degrees of the screw.

When the screw stops, the drum also stops for a short period (until it is again driven by the operation of the return screw 77). When the drum comes to a stop, the cam 92 keeps its contact closed, and a time limit relay TL—1 is energized, which, however, is so timed as to close its contact about one second or so after the drum has stopped. Closing of the contact of this time limit relay energizes coil 122, closing switch 122', thus energizing coil 123. The energization of the coil 123 closes switch 123' (see Fig. 16), starting the motor 124. A similar arrangement at the same time energizes coil 125 closing switch 125' thus energizing coil 126, closing switch 126' and starting the other rotary index motor 127. The various coils above mentioned will be operated when the time limit relay TL—1 closes, since switch 128' is closed by the energization of coil 128. The time limit relay TL—1 serves as a safety to prevent starting of rotary index motion before the longitudinal index screw comes to an absolute stop. The rotary index motors 127 and 124 are geared to the index table, and revolve exactly 180 degrees, bringing the fixture at the end of the line down to the bottom and bringing the fixture which was at the bottom at the head of the line up to the top to be loaded again. Suitable feed limit switches 129 and 130 are employed to control the stopping of the index motors.

At the same time the rotary index motions take place, the closed contact of cam 92 has also energized electric solenoid coils 132 and 133. The first of these is attached to a commercial air or hydraulic control valve (see Fig. 14) of any suitable character and shifts its piston in a direction to let air or other fluid under pressure enter the line 134, causing the various locating pins 135 to descend and enter the holes provided in the fixtures to exactly locate the fixtures in their proper positions for machining the work piece which they carry. At the end of the line 134 is a pilot line 136 supplying fluid to pilot valve 137 and reset valve 138. The latter shifts the pilot valve 137 to position to let fluid enter the line 139, operating a suitable valve 140 to a position to let fluid enter line 141. This causes the rotary fluid valve 142 to turn 180 degrees, rotating a shaft 143 through 180 degrees through an eccentric connection, moving the broach saddle 144 downwardly. The broach saddle carries locating pins which enter the holes provided in the fixture and locates the fixture in its proper place.

The line 134 also supplies fluid to a cylinder 147 on the turn table at station M, thus lowering the head 148 which is provided with locating pins engageable with the holes in the fixture. At the end of the stroke of the piston 147 a projecting member 149 unbalances a control valve 150, causing its piston to move to such position as to let fluid enter line 151 and operate a rotary piston so as to cause the rotary head 148 to turn exactly 90 degrees. Similar operations take place at the turn table of station G.

Solenoid 133 which was also operated with solenoid 132 supplies fluid from a supply pipe 154 to a line 155 causing the piston of cylinder 156 to move to the right. This piston is connected to levers as indicated in Fig. 12 so as to turn the fixture guide arms 54 and 55 into their cross positions ready to guide the fixtures out of the cross stations $D^1$ and $F^1$.

Shortly before the cam 90 opens its contact at the end of nine revolutions of the screw, cam 93 on the drum, which controls the return screw motors 127 and 124, closes its contact, but no current is supplied to the return screw motors until the rotary index operations have been completely stopped and the rotary limit switch 130 has closed a circuit through the time limit relay TL—2. The time limit relay operates after a second or so delay, to then start the return screw motor, consequently causing the drum to rotate. The time limit relay TL—2 is inserted in this circuit for safety to insure complete engagement of a fixture with the return screw before the return screw starts moving. The return screw now propels the fixture towards the head of the line. The broach at this time is also performing its cutting operation under the control of its self-contained fluid pressure operated control system.

The locating pins 135 of the various machine tools have moved their respective fixtures to their proper positions after stopping the index screw. These pins are attached to pistons 135' which have extensions 158 which open and close double limit switches 159 and 160. With the pins in their lowered positions, the extensions 158 each opens a switch 159 and closes a switch 160. The closing of all the contacts or switches 160, as indicated in Fig. 17, operates the tool heads or cutting devices of the various machines, so that all of the drilling operations at stations H, I, J, K, and L start simultaneously.

Shortly before the cam 90 opens its contact, cam 96 which controls the starting of the fixtures in both directions at stations $D^2$ and $F^2$, closes its contact but no current is supplied to the cross-index motors 162 and 163 until the cross index levers 54 and 55 have each closed a circuit through a limit switch 165. The closing of the limit switches 165 energizes the cross-index motors 162 and 163 so that the cross-index screws will pick up the fixtures at stations D and F and propel them to the machines $D^2$ and $F^2$. Towards the end of its travel, the fixtures are slowed down, since the motors are slowed down at this time, so that when the fixture disengages itself from the transverse feed screw section it stops at the proper place. After it has disengaged itself from the screw, limit switches 167 and 168 open their contacts and dynamic braking is applied to stop the fixtures within 60 degrees overtravel of the screw. The limit switches 167 and 168, together with a number of additional limit switches are provided in the boxes 169 and operated in proper timed sequence by movable controllers which are driven from the motors 162 and 163.

Shortly after the fixture leaves the center of station D on its outward travel movement to $D^2$, the reverse limit switch 170, operated in timed relation with switches 167 and 168 is closed, but no reversing of the motors takes place as the limit relay TL—4 (which is controlled by a limit switch controlled coil TL—4') is kept open. The motors which operate the lateral screw sections come to rest by opening of the limit switch 167 at the same time the reverse limit switch contact 171 is closed; and after cam 96 opens its contact to cut its current completely off, TL—4 closes, thus establishing the reverse circuit for the motors. At the next cycle the motors 162 and 163 will start up in the reverse direction and thus move the fixtures back to the line of advance.

When the cam 92 opens its contact, deenergizing the solenoids 132 and 133, cam 99 has closed its contact. At the same time, reverse limit switches 171, 172 and 173 will close, energizing the solenoid coils 174 and 175'. The solenoid 175' operates its valve to supply fluid to a line 176, shifting the piston 177 attached to the cross index screw section so that the cross screws are moved a predetermined distance to bring the end of the thread below the pin on the fixture after the machining operation has been completed on the work. The solenoid 174 similarly operates to move the plungers 178 of machines $D^1$ and $F^1$ downwardly and bring the locating pins 179 of the machines $D^1$ and $F^1$ into engagement with the working fixtures carried in those machines. The pistons 178 also carry extensions similar to the pistons 135' of the single drilling machines, these extensions operating switches 180 and 181. The closing of all the contacts 181 of the machines $D^1$ and $F^1$, when the plungers 178 are lowered, energizes the tool head motors, thus causing the operation of the drills. Lowering of the tool heads opens switches 184 deenergizing solenoid 174.

While the drum 89 is still turning, driven by the return screw, the cam 99 opens its contact, deenergizing solenoids 174 and 175. Subsequently cam 100 closes its contact, but no circuit is established at that instant. The machining operations at stations $D^2$ and $F^2$ have been meanwhile completed and the tool heads returned to their upper positions, closing limit switches 184. This energizes solenoid coil 185 to raise the locating pins and the head which carries them. Solenoid 185 operates its valve to supply fluid to line 186, raising the various pistons and the pin holding heads of machines $D^2$ and $F^2$.

Raising of the locating pin heads of machines $D^2$ and $F^2$ closes contacts or switches 188 and opens contacts 189. The closing of the contacts 188, with the cam 97 closing its contact supplies current through the time limit relays 190 and 191 establishing circuits to energize the cross-traverse motors 192 and 193, and as the reverse circuit was established at the previous cycle the motors are started so as to move the fixtures from machines $D^1$ and $F^1$ back to the line of advance. Toward the end of its travel the motor slows down the same way as previously described in the opposing machines $D^2$ and $F^2$. After the fixture leaves the lateral feed screw section, relay switches 194 and 195 open and stop the motors by dynamic braking before 60 degrees over-travel of the screw.

Shortly after the fixtures leave the stations $D^1$ and $F^1$ traveling towards the center or line of advance, limit switches 197 and 198 are automatically opened to prevent the solenoid 199 and solenoid 185' from being energized when the cam 101 closes. At the same time, limit switches 194 and 195 are closed partly establishing the outward feeding circuit for the next cycle, but no movement takes place as the time relay TL—7 and TL—9 are kept open until cam 97 has opened its contact. Then TL—7 and TL—9 are closed to establish the outward feeding circuit for the next cycle.

The solenoid 199 operates the feeding screws for the machines D' and F' longitudinally at the proper time, the circuit for the motors which turn these screws being established when cam 101 recloses its contact. Reverse limit switches 200, 201, 202 and 203 are also closed to short-circuit time limit relay coil 204 which operates the time limit relay TL—11, and which closes after a second or so of delay to energize solenoid 133'. This operates the fluid pressure valve to supply fluid to the line 205 which moves the fixture guiding levers so as to guide the fixtures in their line of advance through the machine series. When these levers come into their longitudinal position they automatically close limit switches 206 which are in circuit in series with the switches 107 shown at the upper part of Fig. 15.

When the various tool heads of the drilling machines H to L inclusive have completed their operations and return to their upper position they each close limit switches 208, provided in series with contact of the cam 98; so that when all of the machines have stopped, the solenoid coil 132' is energized and its control valve is shifted to supply fluid to line 209 thus causing the pistons 135' to move upwardly, withdrawing the locating pins from the fixtures. At the end of the upward movements of the various pistons, their extensions open contacts 160 and close contacts 159, thus partly establishing the circuit for longitudinal indexing.

The broach in the meantime has finished its cutting stroke, and its trip 210 has shifted the pilot valve 137 to the right, causing fluid to enter the line 139', reversing the operation of the valve 140 and reversing the operation of the valve 142 so as to move the broach saddle through the eccentric arrangement in an upward direction. The broach proper returns to its original position by its own operating unit. The piston of the resetting valve 138 is moved upward toward its original position by the supply fluid through the line 35 209. At this time the return screw comes to a stop, having been previously slowed down by the cams 94 and 95 which control circuits for cutting in resistances for the control of the speed of the return screw at the end of its operating movement. Shortly after the fixture leaves the return screw, the cam 93 opens its contact to stop the return screw motors 211 and 212 and apply dynamic braking. At the same time cam 93 opens its contact, cams 90 and 91 close their contacts, and cams 98 and 101 close their contacts. The closing of these contacts initiates a new cycle. In this new cycle, after the longitudinal indexing of the fixtures has taken place, the fixtures will move from the center of stations D and F to the machines $D^1$ and $F^1$ instead of moving to machines $D^2$ and $F^2$ as they did in the previous cycles. After the fixtures on these stations come to rest, solenoid coils 199 and 185 will be energized by closing contact of cam 101, and the forward switches 197 and 198. The solenoid coil 199' operates one side of the solenoid shown in Fig. 14, shifting its piston so as to let fluid enter the line in order to move the transverse feed screw sections $D^1$ and $F^1$ outwardly so that the screws may pick up the fixture in the machines $D^1$ and $F^1$ in their feeding movement. The solenoid 185' operates to supply fluid to the line which lowers the pistons 178' provided on the machines $D^2$ and $F^2$ so that the locating pins on the heads of these machines are engaged with the holes in the fixtures.

After the completion of the operations of machines $D^2$ and $F^2$ the tool heads of those machines move up and close limit switches 184' in series with the contact of cam 100, energizing solenoid coil 174' operating the fluid control valve to supply fluid to move the pistons 178 of machines $D^1$ and $F^1$ upwardly thus withdrawing the locating pins from the fixtures in these machines.

After the reverse cross-indexing from the machines $D^2$ and $F^2$, limit switches 215 and 216 are closed, energizing solenoid 175. The coil of this solenoid shifts the piston of the solenoid valve to supply fluid in such a manner as to cause endwise movement of the screws of machines $D^2$ and $F^2$ so that they will be able to pick up the fixtures for cross indexing when the next cycle starts.

The limit switches (171, 172, 173, 194, 195, etc.) are all operated at their proper times in the several switch boxes 169 of the machines $D^1$ and $D^2$ and $F^1$ and $F^2$ and properly interrelate the various feeding and operating movements of these machines with the other machines of the series. Suitable auxiliary circuits, shown diagramamtically in Fig. 17, are interposed as required by the various operated mechanisms shown in Fig. 15. The controlled devices such as the motors, the motor resistances, switches, etc., are shown in Fig. 16.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. Apparatus of the character described comprising a series of mechanisms spaced different distances apart and one following another for successive operations on work pieces, work carrying fixtures, and feeding means for moving said fixtures predetermined amounts to advance them through said mechanisms, said feeding means comprising a rotatable device extending through a number of said mechanisms and having threads engageable with the fixtures and arranged to advance a fixture different distances in accordance with the different spacings of said mechanisms at different locations along said device for a given number of revolutions of said device.

2. Apparatus of the character described comprising a series of mechanisms spaced different distances apart and one following another for successive operations on work pieces, and feeding means for moving said work pieces predetermined amounts to advance them through said mechanisms, said feeding means comprising a rotatable device extending through a number of said mechanisms and having threads of different lead at different points along the length of said device for simultaneously advancing different work pieces different amounts in accordance with the different spacings of said mechanisms, and means for intermittently operating said feeding means a predetermined number of revolutions to advance the work pieces through said different amounts.

3. Apparatus of the character described comprising a series of mechanisms spaced different distances apart and adapted for successive operations on work pieces, work carying fixtures, and feeding means for moving said fixtures predetermined amounts in a step by step manner to advance the fixtures to and through said mechanisms, said feeding means comprising a rotatable shaft extending through a number of said mechanisms and having threads of different lead with the lead of the threads coordinated with the distance between mechanisms, said threads being engageable with the fixtures to advance different fixtures different distances for a definite number of revolutions of said shaft, and means for intermittently operating said shaft a predetermined number of revolutions.

4. Apparatus of the character described comprising a series of mechanisms one following another and adapted for successive operations on work pieces, work carrying fixtures, and feeding means for moving said fixtures predetermined different distances from one mechanism to another, said feeding means comprising a threaded shaft formed of longitudinally connected sections, the threads of the different sections having leads cordinated with the distance between mechanisms.

5. Apparatus of the character described comprising a series of mechanisms one following another and adapted for successive operations on work pieces, work carrying fixtures, and feeding means for moving said fixtures through said mechanisms and from one mechanism to the next, said feeding means comprising screw sections engageable with the fixtures, the threads of each section being spaced such a common distance from the threads of an adjacent section as to advance a fixture to a position free of engagement therewith before the fixture is engaged by the succeeding section, whereby a dwell period is provided for the fixtures at the end of each advancing step.

6. Apparatus of the character described comprising a series of mechanisms one following another and adapted for successive operations on work pieces, work carrying fixtures, and feeding means for moving said fixtures predetermined amounts to advance them through said mechanisms and from one mechanism to another, said feeding means comprising a series of screw sections having threads of different lead engageable with the fixtures, supporting means for said sections engaging the outer sides of the threads at one side of the sections, and means for driving said sections at different points along the length of said feeding means.

7. In an apparatus of the character described, work carrying fixtures, and feeding means for moving said fixtures predetermined distances, said feeding means comprising screw sections, said work carrying fixtures each having a plurality of screw engaging projections, the threads of one section being spaced from the threads of an adjacent section a distance slightly greater than the distance between the projections on a fixture, so that the fixture is not engaged by a following section until after the fixture is moved completely out of engagement with the preceding section.

8. In a series of mechanisms adapted for successive operations on work pieces, work carrying fixtures each having a pair of screw engaging projections, and feeding means for said fixtures adapted to advance them through said mechanisms and from one mechanism to another in steps of different length, said feeding means comprising screw sections having threads of different lead in accordance with the required step lengths but each section adapted for simultaneous driving engagement with the said pair of fixture projections.

9. Apparatus for the character described comprising a series of mechanisms one following another and adapted for successive operations on work pieces, work carrying fixtures, operable through said mechanisms, and a turn table in said series provided between a pair of adjacent mechanisms and adapted to rotate a fixture a predetermined angular amount when it reaches the turn table, feeding means for advancing said fixtures step by step through said mechanisms to and from said turn table, each of said fixtures having means cooperatively engaged by said feeding means in either position of advance of the fixture.

10. Apparatus of the character described comprising a series of mechanisms one following another and adapted for successive operations on work pieces, work carrying fixtures, a turn table in said series provided between a pair of adjacent mechanisms and adapted to rotate each fixture as it reaches the turn table station, and feeding means for advancing the fixtures step by step from one mechanism to another and for advancing the fixtures to and from said turn table, each fixture having means cooperatively engaging said feeding means for advancing the fixture to said turn table and having additional means cooperatively engaging said feeding means for advancing the fixture from said turn table.

11. Apparatus of the character described comprising a series of mechanisms one following another and adapted for successive operations on work pieces, work carrying fixtures, a turn table in said series provided between a pair of adjacent mechanisms for rotating a fixture supplied thereto on a vertical axis through a predetermined angular amount, and a common feed screw engageable with said fixtures for advancing the fixtures step by step from one mechanism to another and to and from said turn table, each fixture having a projection symmetrically located between its sides and engaged by said screw as the fixture is advanced to the turn table and having an additional projection symmetrically located between its sides as the fixture leaves the turn table and engaged by said screw.

12. Apparatus of the character described comprising a series of mechanisms one following another and adapted to perform different operations on work pieces passing through such series, means for feeding a series of similar work pieces step by step in a common line of advance through said series, additional mechanisms disposed laterally on opposite sides of said series, and means for moving successive work pieces out of the common line of advance to opposite sides of said series to said additional mechanisms and for returning the work pieces from said additional mechanisms back to the line of advance.

13. Apparatus of the character described comprising a series of mechanisms one following another and adapted to perform different operations on work pieces passing through such series, work carrying fixtures, means for feeding said fixtures step by step through said series from one mechanism to a following mechanism, a transfer station provided in said series, a plurality of additional mechanisms disposed laterally of a common point of said series at said transfer station, and means operated in timed relation with said feeding means for moving successive fixtures out of a common line of advance to different laterally disposed mechanisms and for returning the laterally moved fixtures back to the line of advance.

14. Apparatus of the character described comprising a series of mechanisms varying in size and one following another in succession for operation on work pieces and adapted for broaching and drilling operations at different stations along the series, work carrying fixtures, and a feed screw for moving different fixtures different amounts coordinated with the spacing between successive stations.

15. Apparatus of the character described comprising a series of mechanisms one following another and adapted for successive operations on work pieces, work carrying fixtures each having screw engaging projections, a feed screw engageable with said projections, pivotally supported guide means engageable with two lateral sides of a fixture for maintaining the fixture in a predetermined attitude as it is moved by said feed screw, and means for rotating said guide means a predetermined amount so that the guide means engage two other sides of the fixture.

16. The method of machining work pieces comprising feeding the work pieces step by step along a series of machine tools in which different successive machining operations are carried out in the interval between successive feeding steps, and alternately shunting successive work pieces temporarily out of a common line of feed and into alternate similar machine tools in which the time of operation is longer than the time between said feeding steps.

17. The method of machining work pieces comprising feeding the work pieces in carrying fixtures step by step along a series of machine tools in which different successive machining operations are carried out in the interval between successive feeding steps, and alternately shunting the successive fixtures and work pieces temporarily out of the line of feed and into alternate similar machine tools in which the time of operation is longer than the time between said feeding steps.

18. The method of similarly machining work pieces comprising feeding the work pieces in carrying fixtures step by step along a series of machine tools in which different successive machining operations are carried out within a given time interval, and at a given point in the series shunting alternate fixtures to alternate machine tools in which the operating time required is longer than the time between the feeding steps, and returning the fixtures alternately from the alternate machine tools after the operation therein has been completed to a common line of advance.

LYNDON C. COLE.